United States Patent [19]
Kunishi et al.

[11] Patent Number: 5,771,314
[45] Date of Patent: Jun. 23, 1998

[54] IMAGE PROCESSING APPARATUS FOR INPUTTING AND PROCESSING PLURAL TYPES OF IMAGE SIGNALS

[75] Inventors: Tsuyoshi Kunishi, Yokohama; Yoshihiko Suzuki, Tokyo; Satoru Kutsuwada, Kawasaki; Keizo Isemura, Kokubunji, all of Japan

[73] Assignee: Canon Kabushiki Kaisha, Toyko, Japan

[21] Appl. No.: 797,602

[22] Filed: Feb. 7, 1997

Related U.S. Application Data

[62] Division of Ser. No. 275,253, Jul. 15, 1994, Pat. No. 5,677,774.

[30] Foreign Application Priority Data

Jul. 23, 1993 [JP] Japan .................................. 5-182476

[51] Int. Cl.[6] ...................................................... H04N 1/40
[52] U.S. Cl. .......................... 382/176; 382/290; 358/448; 358/462
[58] Field of Search .................................... 358/447, 448, 358/456, 462, 464; 382/176, 189, 198, 268, 270, 292, 290; H04N 1/40

[56] References Cited

U.S. PATENT DOCUMENTS

| 4,797,945 | 1/1989 | Suzuki et al. | 382/56 |
| 4,868,684 | 9/1989 | Suzuki | 358/455 |
| 5,065,446 | 11/1991 | Suzuki et al. | 382/56 |
| 5,083,215 | 1/1992 | Hashimoto et al. | 358/448 |
| 5,089,884 | 2/1992 | Suzuki et al. | 358/80 |
| 5,187,593 | 2/1993 | Kurita et al. | 358/434 |
| 5,305,116 | 4/1994 | Kagami | 358/448 |
| 5,371,610 | 12/1994 | Sugawa | 358/434 |
| 5,539,843 | 7/1996 | Murakami et al. | 382/270 |
| 5,644,366 | 7/1997 | Ushida et al. | 358/462 |
| 5,677,774 | 10/1997 | Kunishi et al. | 358/462 |

Primary Examiner—Kim Yen Vu
Attorney, Agent, or Firm—Fitzpatrick, Cella, Harper & Scinto

[57] ABSTRACT

When a binary image signal or multivalued image signal is input to form an image, if the binary image signal is input, one of the line width output characteristic previously stored in memory is set and displayed. If the multivalued image signal is input, one of the density output characteristic previously stored in the memory is set and displayed. Each of the line width output characteristic and the density output characteristic can be changed by the operator. The line width output characteristic is changed by changing the development bias voltage, and the density output characteristic is changed by changing the γ-table.

14 Claims, 7 Drawing Sheets 5,771,314

IMAGE PROCESSING APPARATUS FOR INPUTTING AND PROCESSING PLURAL TYPES OF IMAGE SIGNALS

This application is a division of application No. 08/275,253 filed Jul. 15, 1994, now U.S. Pat. No. 5,677,774.

BACKGROUND OF THE INVENTION

1. Field of the Invention

The present invention relates to an image processing apparats for processing an image in accordance with the type of the input image signal.

2. Description of the Related Art

Some image forming apparatus for developing a digital image signal to an image are provided with input paths for a plurality of types of digital image signals so as to select one of the plurality of types of digital image signals and form an image corresponding to the type of the selected digital image signal.

Such digital image signals can be divided into the following two types: A first type is binary digital image signals which indicate only the presence of a dot, as image signals of documents or the like formed by an image signal producing device such as a computer or the like. A second type is multivalued digital image signals which indicate not only the presence of a dot but also gradation of density, as the image signals read from an original or the like by image read means using CCD.

In respect to an output image of a binary digital image signal, it is required to permit selection, according to circumferences, of the characteristic that dots or lines are output with a size or width slightly larger than the actual size so as to form dot or line images having a size or width of about 1 or 2 pixels as dark images, or the characteristic that dots or lines having the actual size are faithfully output so as to permit read of dot or line images which form a very small character or figure and which are spaced a few pixel apart. The image output characteristic is referred to as "line width output characteristic" hereinafter. Means for changing the line width output characteristic which is required in development of the binary digital image signal involves the following means:

In an image forming apparatus comprising an electrophotographic means as development means, the contrast between the potential of an image white portion and the potential of an image black portion is changed in the process of forming a latent image, or the development bias voltage applied to a developer bearing member of a image forming section is changed so as to change the development contrast applied to a toner in a development portion and consequently change the line width output characteristic. In an image forming apparatus utilizing an ink jet means as the development means, electric power supplied to the ink nozzle is changed to change the amount of the ink discharged and consequently change the line width output characteristic.

On the other hand, in respect to an output image of a multivalued digital image signal, it is required that the γ-characteristic (characteristic between input density and output density) with respect to the density of the output image can be selected in accordance with the input image signal. The γ-characteristic is referred to as "density output characteristic" hereinafter. Means for changing the density output characteristic which is required in development of the multivalued digital image signal involves the following means.

The density level of each of the pixels of a multivalued digital image signal is changed by arithmetic processing using table conversion to change the density output characteristic. This processing is referred to as "γ-conversion" hereinafter. After γ-conversion, the multivalued digital image signal is sent to development means employing an electrophotographic or ink jet process. The development means forms an image on the basis of the density of a desired pixel corresponding to the image signal value thereof after the γ-conversion.

This type of conventional image forming apparatus forms an image in accordance with the image output characteristic (line width output characteristic, density output characteristic) for density selected by the operator using a image output characteristic selecting switch disposed on an operation section, as shown in FIG. 6, and the type of the digital image signal for which image formation is executed (FIG. 7).

Although details are not described below, this conventional apparatus employs as the development means the electrophotographic process, and changes the line width output characteristic by changing the development bias voltage (refer to S24 to S27). In addition, γ-conversion of the input multivalued digital image signal is performed by table conversion processing to change the density output characteristic of the input multivalued image signal value (refer to S29 to S32). γ-conversion tables 1, 2 and 3 correspond to the density output characteristics shown by characters A, B and C, respectively, in FIG. 8(A), 8(B) and 8(C).

The above-described conventional image forming apparatus has the following problems:

When the operator of a computer always demands the characteristic of being thick as the line width output characteristic of the image forming apparatus, while the operator of the image reading device always demands the characteristic of low density as the density output characteristic of the image forming device, each of the operators must confirm the set state of a switch or key for selecting the image output characteristic of the image forming apparatus every time before image format ion is executed. If the set state does not agree with the demand, the image output characteristic selecting switch or key must be operated.

If this confirmation work is not performed, an image having the characteristics different from those demanded by the operator is output. Namely, the conventional image forming apparatus has the important problem that the operation is frequently performed by the operator and is complicated and easily produces error.

SUMMARY OF THE INVENTION

It is an object of the present invention is to provide an image forming apparatus having none of the above problems.

It is another object of the present invention is to provide an image forming apparatus which can select an image output characteristic in accordance with the type of the input image signal and display the selected characteristic, thereby constantly obtaining a good image.

A further object of the present invention is to provide an image forming apparatus which can change the image output characteristic selected in accordance with the type of the input image signal to obtain a desired image.

Other objects of the present invention will be made clear from the description with reference to the accompanied drawings and the claims.

DETAILED DESCRIPTION OF THE PREFERRED EMBODIMENT

The present invention is described in detail below with reference to an embodiment.

Figure 4:
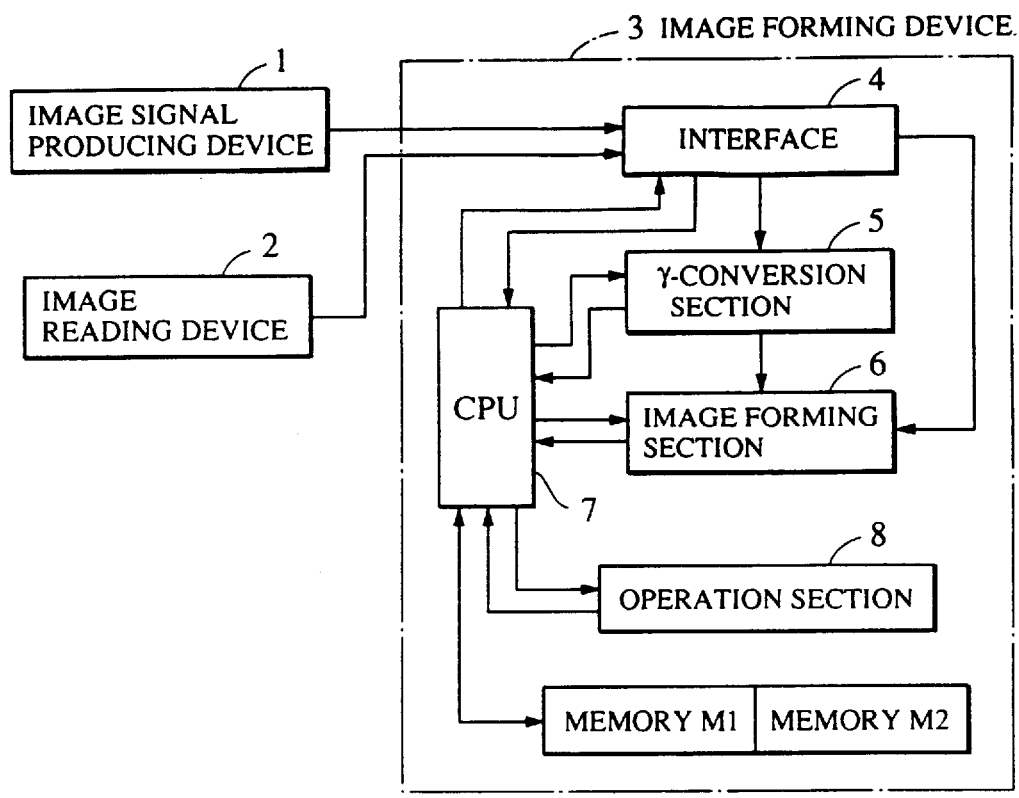
FIG. 4 is a block diagram of the embodiment.

FIG. 4 is a block diagram illustrating flows of an image signal and a control signal in an image forming apparatus.

This embodiment is provided with paths of input from two types of image signal output devices including an image reading device 2 for reading image information of an original and converting the read image signal into a multivalued digital image signal having values of 0 to 255, and an image signal producing device 1 such as a computer or the like which can produce and edit a binary digital image signal having values of 0 and 1. Although the typical configuration of the image reading device 2 is not shown in the drawings, the image reading device 2 has the following configuration: The light emitted from a halogen lamp or a fluorescent lamp is applied to the original, the light reflected from the original is projected on photoelectric conversion means such as a CCD by an optical system comprising a lens or mirror, and the generated analog electric signal is converted into a multivalued digital image signal having values of 0 to 255 by A/D conversion means. In this embodiment, it is assumed that the level of the digital image signal corresponds to a density level of an image.

The above two types of image signal output devices are connected to an interface 4 in an image forming device 3. When one of the image reading device 2 and the image signal producing device 1 transmits an image signal to the image forming device 3, the interface 4 automatically selects the one of the image signals of the two devices. When the selected image signal is a multivalued image signal, the signal is transmitted to a γ-conversion section 5 without any conversion. When the selected image signal is a binary image signal, the image signal is transmitted to the image forming section 6 after the signal levels of 0 and 1 are converted into 0 and 255, respectively.

Figure 8A:
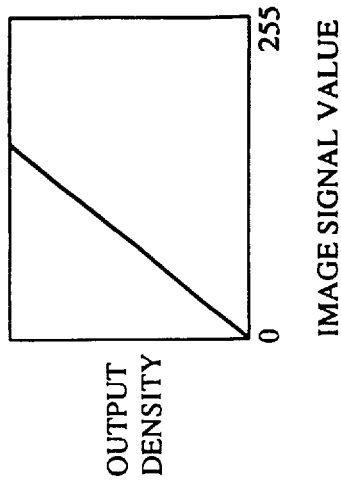
FIGS. 8(A) 8(B) and 8(C) are drawings illustrating an example of a γ-conversion table.
Figure 8B:
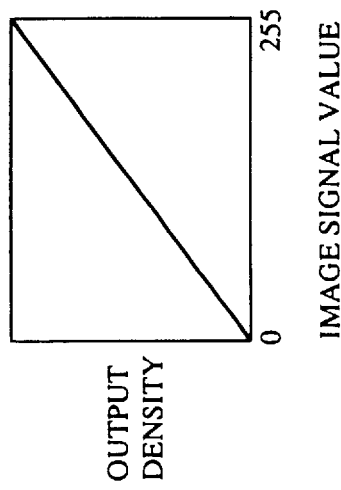
Figure 8C:
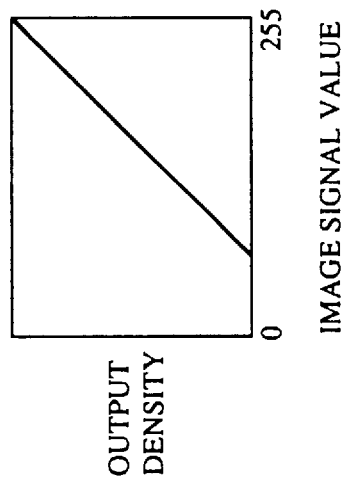

After the image signal level of any desired pixel of the multivalued image signal is converted by table conversion processing, the γ-conversion section 5 transmits the image signal subjected to γ-conversion to the image forming section 6. In the γ-conversion section 5, one of the three density output characteristics A, B and C shown in FIGS. 8(A), 8(B) and 8(C) selected in accordance with the control signal transmitted from a CPU 7 and used for γ-conversion. The γ-conversion characteristics are not limited to these.

The image forming section 6 forms an image on a recording sheet on the basis of the image signal transmitted from the interface 4 and the γ-conversion section 5.

Figure 5:
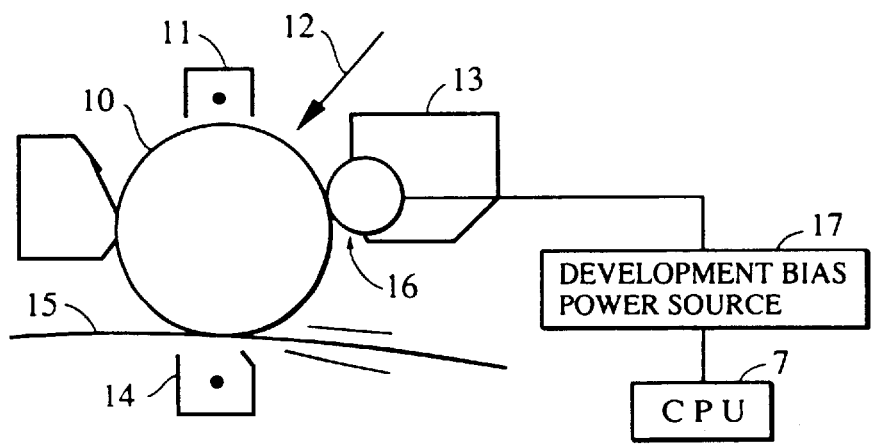
FIG. 5 is a schematic drawing illustrating a image forming section used in the embodiment.
Figure 6:
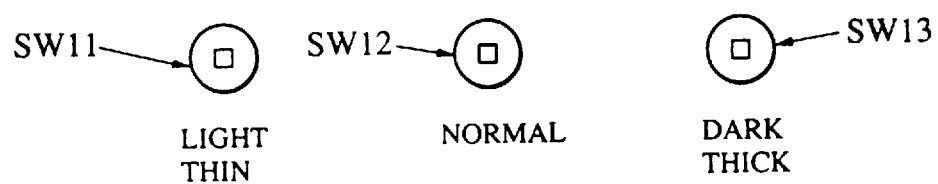
FIG. 6 is a schematic drawing illustrating a switch for selecting image output characteristics in a conventional example.
Figure 7:
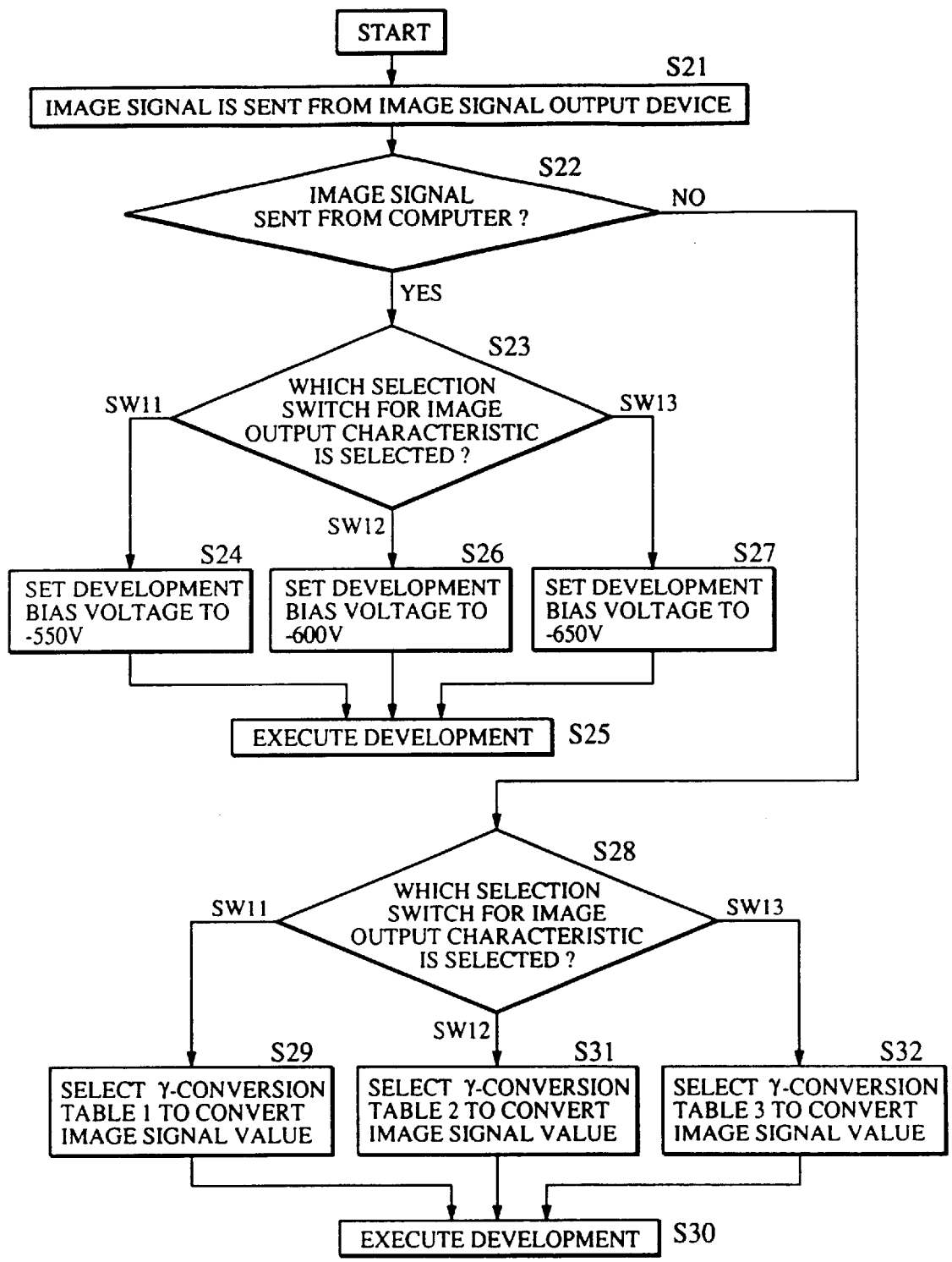
FIG. 7 is a flowchart illustrating the operation of the conventional example.

FIG. 5 is a schematic sectional view of a principal portion of the image forming section 6 in this embodiment. The surface of an image holding member (photosensitive member) 10 which is uniformly charged by a primary charger 11 is scanned by a laser beam 12 emitted in correspondence with the signal value level (0 to 255) of the multivalued image signal to form an electrostatic latent image on the surface of the image holding member 10. The electrostatic latent image is developed to a toner image by a development unit 13, and the toner image is transferred to a transfer material 15 by a transfer unit 14, fixed to the transfer material 15 by a fixing unit (not shown), and then the transfer material 15 is discharged. The image forming section 6 forms the toner image having a density corresponding to the image signal value of a desired pixel on the transfer material 15. In this embodiment, the uniform charge potential of the surface of the image holding member 10 is −700 V, and the latent image potentials corresponding to the image signal levels 0 and 255 are −700 V and −250 V, respectively. The development unit 13 develops the electrostatic latent image on the surface of the image holding member 10 by opposing a developer holding member 16 to which a development bias voltage is applied, to the image holding member 10. The development method of the development unit 13 is a reversal developing method using a toner having a minus polarity. The value of the DC component of the bias voltage supplied to the developer holding member 16 from a development bias power supply 17 is changed in accordance with the control signal transmitted from the CPU 7.

Figure 1:
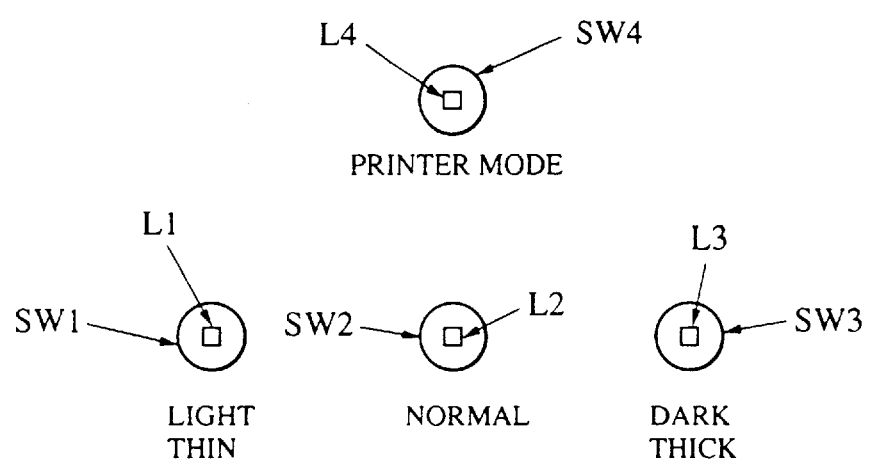
FIG. 1 is a schematic drawing of a switch for selecting image output characteristics in an embodiment of the present invention.

FIG. 1 is a schematic drawing of image output characteristic selecting switches of an operation section 8 in the image forming device 3 in accordance with the present invention. The operation section 8 has a printer mode change-over switch SW4 for selecting the type of image signal, and image output characteristic setting switches SW1, SW2 and SW3 for setting the image output characteristic corresponding to the selected type of image signal. The switches SW1, SW2, SW3 and SW4 comprise LED L1, L2, L3 and L4, respectively, which are turned on in accordance with operation.

Figure 2:
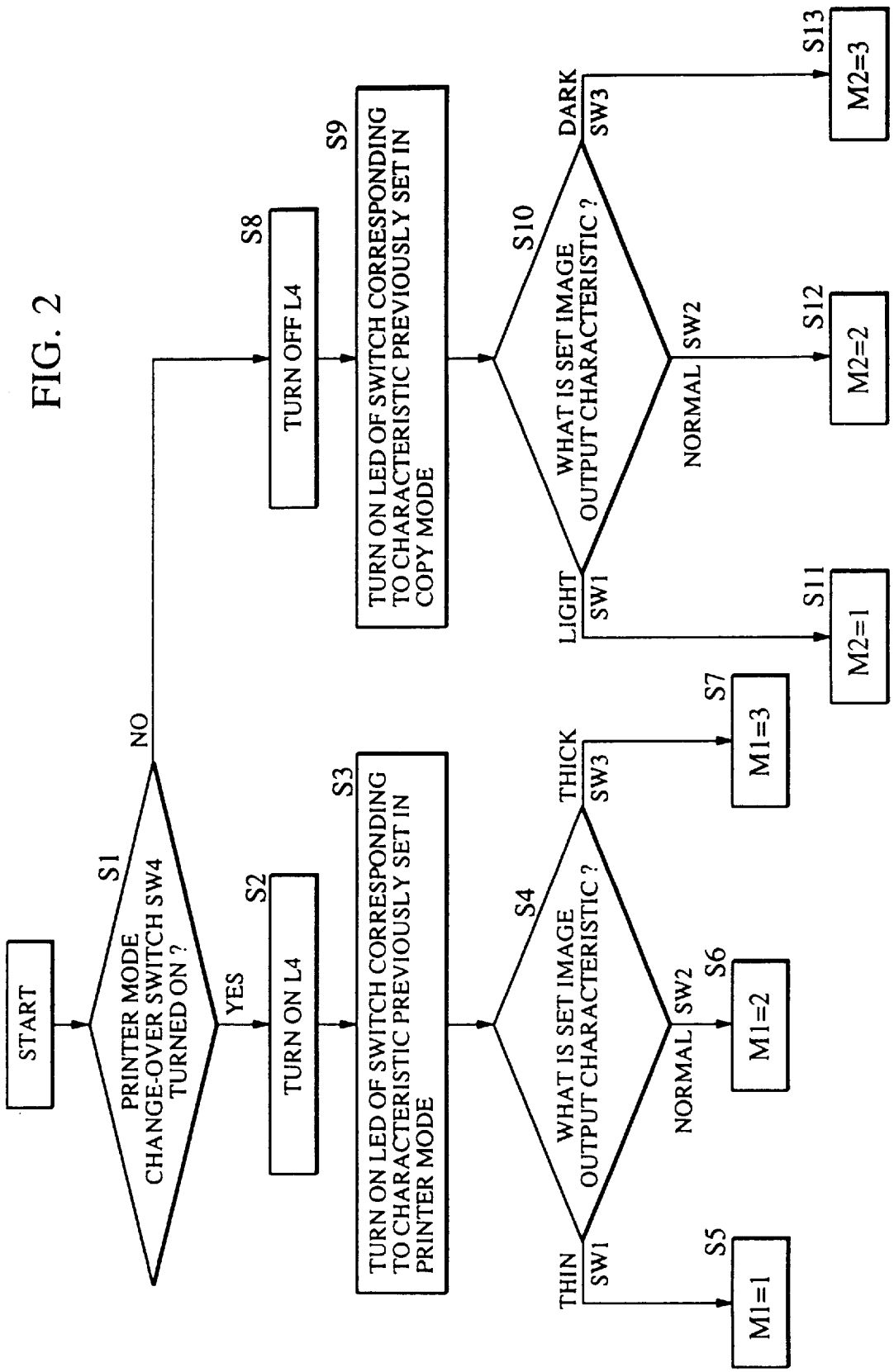
FIG. 2 is a flowchart for selecting and setting image output characteristics in the embodiment.

The CPU 7 selects and sets the image output characteristic and turns on the LED in accordance with the flowchart shown in FIG. 2.

When the line width output characteristic of the image signal transmitted from the image signal producing device 1 is set (referred to as "printer mode" hereinafter), one of the image output characteristic setting switches SW1, SW2 and SW3 which corresponds to a desired characteristic is pushed in the state wherein the printer mode change-over switch SW4 is turned on (S1, S2), and the pushed switch is decided (S4). Data corresponding to the set characteristic (the switches AW1, SW2 and SW3 correspond to M1=1, 2 and 3, respectively) is then stored in memory M1 (S5 to S7). In the printer mode, the image output characteristic setting switches SW1, SW2 and SW3 correspond to the line width output characteristics of being thin, normal and thick, respectively.

At the same time the printer mode change-over switch SW4 and the LED4 are simultaneously turned on (S1 YES, S2), only the image output characteristic setting switch corresponding to the characteristic previously set in the printer mode is turned on (S3). When the characteristic is set over again, only the LED of the switch corresponding to the set image output characteristic is turned on.

When the density output characteristic of the image signal transmitted from the image reading device 2 is set (referred to as "copy mode" hereinafter), the printer mode change-over switch SW4 is turned off. At the same time, the L4 is turned off, and the LED of the switch corresponding to the characteristic previously set in the copy mode is turned on (S9). When one of the image output characteristic setting switches SW1, SW2 and SW3 which corresponds to a desired characteristic is pushed, the pushed switch is decided (S10), and the LED only of the pushed switch is turned on (S1 to S13). At the same time, data corresponding to the set characteristic (the switches SW1, SW2 and SW3 correspond to M2=1, 2 and 3, respectively) is stored in memory M2. In the copy mode, the image output characteristic setting switches SW1, SW2 and SW3 correspond to the density output characteristics of being light, normal and dark, respectively. The lighting state of the LED is the same as that in the printer mode except that the LED 4 is not turned on.

Figure 3:
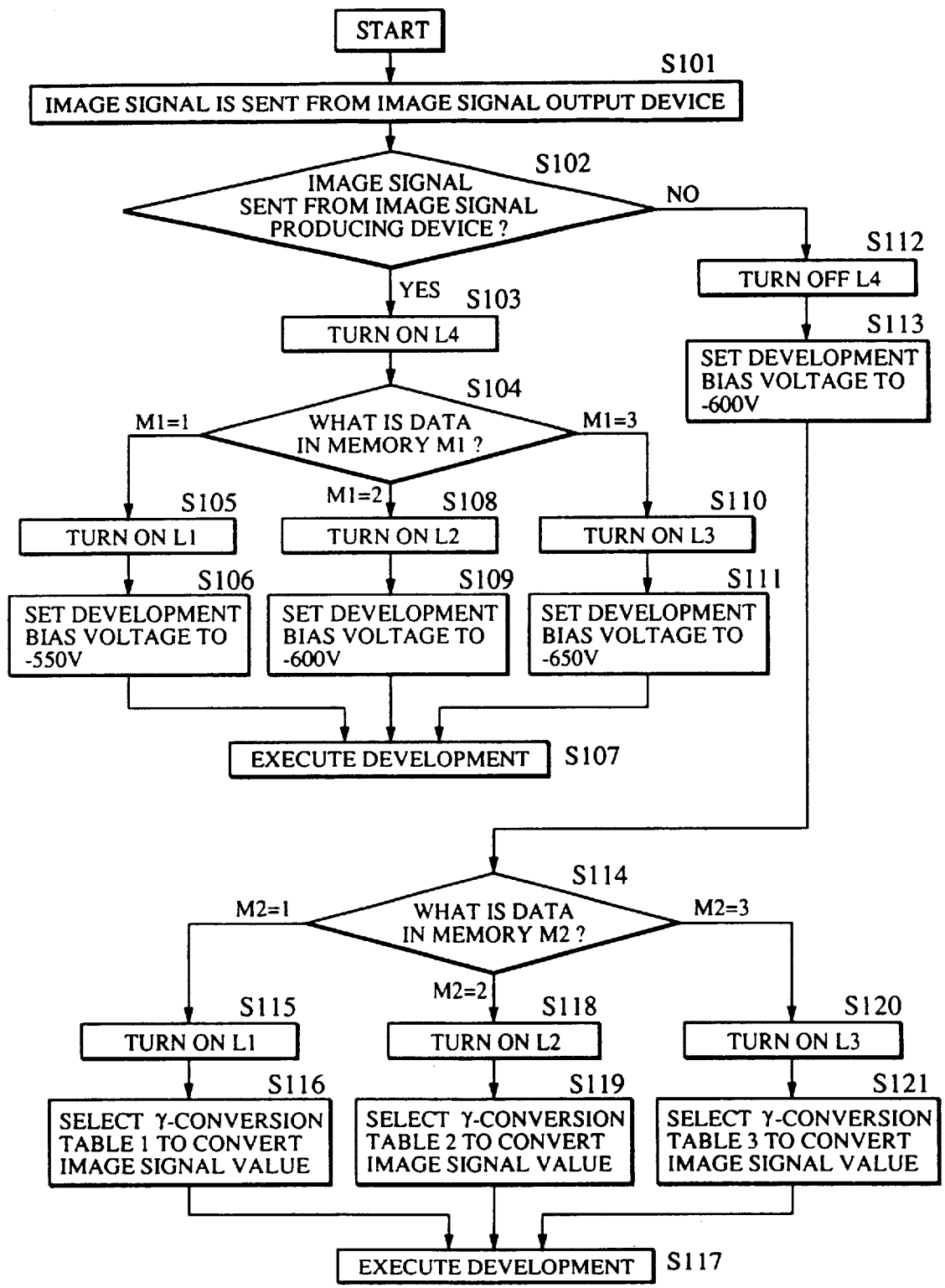
FIG. 3 is a flowchart illustrating the operation of the embodiment.

FIG. 3 is a flowchart of the main operation of image formation in this embodiment.

When an image signal is transmitted to the interface 4 of the image forming device 3 from the image reading device 2 or the image signal producing device 1 (S101), the CPU 7 decides which transmits the image signal, the image reading device 2 or the image signal producing device 1 (S102).

When the image signal is transmitted to the interface 4 from the image signal producing device 1 (S102, YES), the CPU 7 turns on the LED L4 of the printer mode change-over switch SW4 of the operation section 8 (S103). A decision is then made as to what is the data stored in the memory M1 (S104).

When M1=1, i.e., when the line width output characteristic is set to be thin, the CPU 7 turns on the LED L1 of the image output characteristic selecting switch SW1 of the operation section 8 (S105), and outputs a control signal to the development bias power supply 17 of the image forming section 6 so that the value of the DC component of the development bias voltage applied to the developer holding member 16 of the developing unit 13 is set to −550 V (S106). The recording operation is then executed (S107). When it is desired to change the characteristic to another characteristic after the LED L1 is turned on, one of the switches SW1 to SW3 may be pushed before the recording operation is started.

When M1=2, i.e., when the line width output characteristic in the printer mode is set to be normal, the CPU 7 turns on the LED L2 of the image output characteristic selecting switch SW2 of the operation section 8 (S108), and outputs a control signal to the development bias power supply 17 of the image forming section 6 so that the value of the DC component of the development bias voltage applied to the developer holding member 16 of the developing unit 13 is set to −600 V (S109). The recording operation is then executed (S107).

When M1=3, i.e., when the line width output characteristic in the printer mode is set to be thick, the CPU 7 turns on the LED.L3 of the image output characteristic selecting switch SW3 of the operation section 8 (S110), and outputs a control signal to the development bias power supply 17 of the image forming section 6 so that the value of the DC component of the development bias voltage supplied to the developer holding member 16 of the development unit 13 is set to −650 V (S111). The recording operation is then executed (S107). The development contrast is changed by changing the development bias voltage so that a dot image having a size of several pixels or a line image having a width of several pixels can be output with a size or width about 10% smaller or larger than the normal size or width. Namely, the line width output characteristic can be changed.

When an image signal is transmitted to the interface 4 from the image reading device 2, the CPU 7 turns off the LED L4 of the printer mode change-over switch SW4 (S112), sets the value of the DC component of the development bias voltage to −600 V (S113) and decides what is the data stored in the memory M2 (S114).

When M2=1, i.e., when the density output characteristic in the copy mode is set to be light, the CPU 7 turns on the LED L1 of the image output characteristic selecting switch SW1 of the operation section 8 (S115) and outputs a control signal to the γ-conversion section 5 so that the γ-conversion table 1 is selected for γ-conversion (S116). The recording operation is then executed (S117).

When M2=2, i.e., when the density output characteristic in the copy mode is set to be normal, the CPU 7 turns on the LED L2 of the image output characteristic selecting switch SW2 of the operation section 8 and outputs a control signal to the γ-conversion section 5 so that the γ-conversion table 2 is selected for γ-conversion (S119). The recording operation is then executed (S117).

When M2=3, i.e., when the density output characteristic in the copy mode is set to be dark, the CPU 7 turns on the LED L3 of the image output characteristic selecting switch SW3 of the operation section 8 (S120), and outputs a control signal to the γ-conversion section 5 so that the γ-conversion table 3 is selected for γ-conversion (S121). The recording operation is then executed (S117). The γ-conversion tables 1, 2 and 3 correspond to the density output characteristics A, B and C, respectively, shown in FIG. 8(A), 8(B) and 8(C).

As described above, in this embodiment, the image output characteristic demanded by the operator (the density output characteristic for the image signal from the image reading device 2, and the line width output characteristic for the image signal from the image signal producing device 1) are previously selected and set for the two types of image signals transmitted from the two types of image signal output devices, i.e., the image reading device 2 and the image signal producing device 1 by the operation section 8, both of which are connected to the image forming device 3 so that an image having the image output characteristic demanded by the operator and corresponding to each of the types of image signals can always be obtained regardless of the type of image signal transmitted. In addition, the type of the image signal and the selected image output characteristic can be confirmed by seeing the operation section 8 of the image forming device 3.

Although the above embodiment uses as the method of changing the line width output characteristic the method of changing the DC component of the development bias voltage applied to the developer holding member 16, the present invention is not limited to this. For example, if a method of changing the AC component of the development bias voltage or the quantity of light of laser beam is used, the same effects as those described above can be obtained.

In the present invention, if a method of converting the level of the image signal of the interface 4 is used as the method of changing the line width output characteristic of the binary image signal, the same effects can be obtained.

When the line width output characteristic is set to be thin, the interface 4 converts the signal values 0 and 1 of any desired pixel into values 0 and 205, respectively. In the case of the characteristic of being normal, the values 0 and 1 are converted into 0 and 225, respectively. In the case of the characteristic of being thick, the values 0 and 1 are converted into 0 and 255, respectively. This changes the amount of the toner which adheres to the photosensitive member to change the line width by about 10%. This method requires no means for controlling the voltage value output from the development bias power supply 17, and thus it can simply be constructed at low cost.

The use of this method also permits the achievement of the same effects by an image forming apparatus using the ink jet process in the image forming section 6. Namely, the line width can be changed by changing the amount of the ink discharged.

In the present invention, the types of image signals transmitted to the image forming device are not limited to the image signals output from the image reading device and the image signal producing device. The image signals may be facsimile image signals or image signals from a data filing device using an optical disk or a magnetic disk.

Further, if one of the digital image signal output devices (for example, the image reading device) is disposed in the image forming apparatus, the same effects can be obtained.

The present invention is not limited to the above embodiment, and various changes can be made within the scope of the claims.

What is claimed is:

1. An image processing method comprising the steps of:
   a) selecting an image output characteristic with respect to the density of an image formed by an image forming means for each of a plurality of types of image signals input by an input means;
   b) storing the latest image output characteristic selected in said step a) for each of said plurality of types of image signals;
   c) inputting an image signal;
   d) deciding the type of the image signal input in said step c);
   e) outputting a control signal for setting the image output characteristic stored in said step b) in accordance with a decision result in said step d);
   f) outputting a signal for indicating the image output characteristic set in said step e) to a display device; and
   g) causing the image forming means to form the image on the basis of the image signal input in said step c) in accordance with the image output characteristic set in said step e).

2. A method according to claim 1, wherein said plurality of types of image signals include a binary image signal and a multivalued image signal.

3. A method according to claim 2, wherein in said step e), a control signal for setting process conditions for the image formation is output when the input image signal is a binary image signal, and a control signal for setting a γ-conversion characteristic is output when the input image signal is a multivalued image signal.

4. A method according to claim 3, wherein said process conditions include a development bias value.

5. A method according to claim 1, further comprising a step of outputting a control signal for displaying the type of the image signal decided in said step d).

6. An image processing method comprising the steps of:
   a) selecting an image output characteristic with respect to the density of an image formed by an image formation means for an image signal from each of first and second image output devices;
   b) storing the latest image output characteristic selected in said step a) for the image signal from each of said first and second image output devices;
   c) inputting a first image signal from said first image output device or a second image signal from said second image output device;
   d) deciding whether the input image signal is said first image signal or said second image signal when an image signal is input in said step c);
   e) outputting a control signal for setting the image output characteristic stored in said step b) in accordance with a decision result;
   f) outputting a signal for indicating the image output characteristic set in said step e) to a display device; and
   g) causing the image formation means to form the image on the basis of the first or second image signal input in said step c) in accordance with the image output characteristic set in said step e).

7. A method according to claim 6, wherein said first image output device outputs a multivalued image signal, and said second image output device outputs a binary image signal.

8. A method according to claim 7, wherein, in said step e), a control signal for setting process conditions for the image formation is output when the input image signal is a binary image signal, and a control signal for setting a γ-conversion characteristic is output when the input image signal is a multivalued image signal.

9. A method according to claim 6, wherein said first image output device is an image reading device, and said second image output device is a computer.

10. A method according to claim 6, further comprising a step of outputting a signal for indicating whether the image signal input in said step c) is the image signal from said first image output device or said second image output device to said display device.

11. An image processing method comprising the steps of:
   a) inputting a plurality of types of image signals;
   b) causing an image forming apparatus to form an image on the basis of the image signal input in said step a);
   c) inputting an indication for changing a previously set image output characteristic to another image output characteristic by an indication device in common with all types of said image signals, said image output characteristic relating to the density of the image to be formed in said step b);
   d) outputting a signal for indicating the image output characteristic set in accordance with the indication input in said step c) to a display device in common with all types of said image signals; and
   e) outputting a signal for indicating the type of the image signal input in said step a) to said display device.

12. A method according to claim 11, wherein a binary image signal or a multivalued image signal is input in said step a).

13. A method according to claim 11, further comprising a step of storing the previously set image output characteristics for each of the types of said image signals and renewing said previously set image output characteristic to the image output characteristic set in accordance with the indication input in said step c).

14. An image processing method comprising the steps of:
   a) inputting a binary image signal and a multivalued image signa;
   b) causing an image forming apparatus to form an image on the basis of the image signal input in said step a);
   c) selecting an image output characteristic with respect to the density of an image to be formed in said step b) independently for each of said binary image signal and said multivalued image signal, in said selecting step, selecting the image output characteristic to be thick or thin for said binary image signal, and the image output characteristic to be dark or light for said multivalued image signal;
   d) storing the image output characteristic selected in said step c) independently for each of said binary image signal and said multivalued image signal; and
   e) outputting a signal for indicating that the image output characteristic for said binary image signal stored in said step d) and said binary image signal are input when said binary image signal is input in step a) and a signal for indicating that the image output characteristic for said multivalued image signal stored in said step d) and said multivalued image signal are input when said multivalued image signal is input in said step a) to a display device.

* * * * *

UNITED STATES PATENT AND TRADEMARK OFFICE
CERTIFICATE OF CORRECTION

PATENT NO. : 5,771,314

DATED : JUNE 23, 1998

INVENTOR(S): TSUYOSHI KUNISHI ET AL.

It is certified that error appears in the above-identified patent and that said Letters Patent is hereby corrected as shown below:

COLUMN 1 line 11,    "apparats" should read --apparatus--; and
   line 49,    "of a" should read --of an--.

COLUMN 2 line 14,    "a" should read --an--;
   line 40,    "format ion" should read --formation--;
   line 49,    "error." should read --errors.--;
   line 52,    "is to" should read --to--; and
   line 55,    "is to" should read --to--.

COLUMN 3 line 11,    "a image" should read --an image--;
   line 18,    "8(A)" should read --8(A),--;
   line 52,    "the one" should read --one--; and
   line 65,    "8(C)" should read --8(C) is--.

UNITED STATES PATENT AND TRADEMARK OFFICE
CERTIFICATE OF CORRECTION

PATENT NO. : 5,771,314
DATED : JUNE 23, 1998
INVENTOR(S) : TSUYOSHI KUNISHI ET AL.

It is certified that error appears in the above-identified patent and that said Letters Patent is hereby corrected as shown below:

<u>COLUMN 9</u> line 5, "signa;" should read --signal;--.

Signed and Sealed this

Sixteenth Day of February, 1999

Attest:

Attesting Officer

*Acting Commissioner of Patents and Trademarks*